United States Patent
Leboucher et al.

(10) Patent No.: US 9,658,034 B2
(45) Date of Patent: May 23, 2017

(54) METHOD AND DEVICE FOR OPTIMISING A RESOURCE ALLOCATION PLAN

(71) Applicant: MBDA France, Le Plessis-Robinson (FR)

(72) Inventors: Cédric Leboucher, Le Plessis-Robinson (FR); Stéphane Le Menec, Le Plessis-Robinson (FR); Hyosang Shin S., Le Plessis-Robinson (FR); Alexandre Kotenkoff, Le Plessis-Robinson (FR)

(73) Assignee: MBDA France, Le Plessis-Robinson (FR)

( * ) Notice: Subject to any disclaimer, the term of this patent is extended or adjusted under 35 U.S.C. 154(b) by 0 days.

(21) Appl. No.: 14/766,447

(22) PCT Filed: Feb. 5, 2014

(86) PCT No.: PCT/FR2014/000029
§ 371 (c)(1),
(2) Date: Aug. 6, 2015

(87) PCT Pub. No.: WO2014/122372
PCT Pub. Date: Aug. 14, 2014

(65) Prior Publication Data
US 2015/0377596 A1    Dec. 31, 2015

(30) Foreign Application Priority Data
Feb. 8, 2013   (FR) ..................... 13 00286

(51) Int. Cl.
*G06G 7/80*   (2006.01)
*F41H 11/00*  (2006.01)
(Continued)

(52) U.S. Cl.
CPC ......... *F41H 11/00* (2013.01); *G06Q 10/0631* (2013.01); *G06Q 10/06315* (2013.01); *G06Q 50/26* (2013.01)

(58) Field of Classification Search
USPC ................ 235/400, 401, 404; 244/3.1, 3.12; 89/1.11; 702/144
See application file for complete search history.

(56) References Cited

U.S. PATENT DOCUMENTS 4,647,759 A * 3/1987 Worsham ............ F41H 13/0062
235/404
5,992,288 A * 11/1999 Barnes ...................... F41G 3/04
700/28

(Continued)

OTHER PUBLICATIONS

Xin, B., and J. Chen, "An Estimation of Distribution Algorithm With Efficient Constructive Repair/Improvement Operator for the Dynamic Weapon-Target Assignment," Proceedings of the 31st Chinese Control Conference (CCC), Hefei, China, Jul. 25-27, 2012, pp. 2346-2351.

(Continued)

*Primary Examiner* — Daniel Hess
(74) *Attorney, Agent, or Firm* — Christensen O'Connor Johnson Kindness PLLC

(57) ABSTRACT

The optimisation device (1) comprises means (4) for inputting data, means (2) for defining, on the basis of input data, time windows of availability and efficiency, relative to resources in consideration, an element (6) for expressing a space of solutions, i.e. said time windows, as probabilities, generating time-continuous functions in compliance with said time windows, an element (8) for optimising the resource allocation plan from the solutions space expressed as probabilities in this way, and user means (11) for using an optimal allocation plan defined in this way.

10 Claims, 1 Drawing Sheet

(51) Int. Cl.
*G06Q 10/06* (2012.01)
*G06Q 50/26* (2012.01)

(56) References Cited

U.S. PATENT DOCUMENTS

| | | | | |
|---|---|---|---|---|
| 6,497,169 | B1* | 12/2002 | Khosla | F41H 11/02 702/144 |
| 6,610,971 | B1* | 8/2003 | Crabtree | F41F 3/04 244/3.1 |
| 7,202,809 | B1* | 4/2007 | Schade | F41A 1/08 244/3.1 |
| 7,757,595 | B2* | 7/2010 | Khosla | F41G 3/04 89/1.11 |
| 8,025,230 | B2* | 9/2011 | Moraites | F41G 3/04 235/404 |
| 8,138,965 | B1* | 3/2012 | Luu | G01S 7/415 342/13 |
| 9,170,069 | B1* | 10/2015 | Smith | G01S 7/495 |
| 9,250,043 | B1* | 2/2016 | Block | F41H 11/02 |
| 2012/0037749 | A1* | 2/2012 | Lance | F41F 1/00 244/3.12 |

OTHER PUBLICATIONS

International Preliminary Report on Patentability mailed Aug. 11, 2015, issued in corresponding International Application No. PCT/FR2014/000029, filed Feb. 5, 2014, 8 pages.

International Search Report and Written Opinion mailed Sep. 22, 2014, issued in corresponding International Application No. PCT/FR2014/000029, filed Feb. 5, 2014, 9 pages.

Khosla, D., and T. Nichols, "Hybrid Evolutionary Algorithms for Network-Centric Command and Control," Proceedings of SPIE, vol. 6249, "Defense Transformation and Network-Centric Systems," Orlando, Fla., Apr. 17, 2006, pp. 624902-1-624902-19.

Leboucher, C., et al., "A Swarm Intelligence Method Applied to Resources Allocation Problem," Proceedings of the International Conference on Swarm Intelligence, Cergy, France, Jun. 14-15, 2011, pp. id-1-id-12.

Wu, L., et al., "An Anytime Algorithm Based on Modified GA for Dynamic Weapon-Target Allocation Problem," Proceedings of the IEEE Congress on Evolutionary Computation (CEC), Hong Kong, Jun. 1-6, 2008, pp. 2020-2025.

* cited by examiner

METHOD AND DEVICE FOR OPTIMISING A RESOURCE ALLOCATION PLAN

FIELD

The present disclosure relates to a device and to a method for optimising a resource allocation plan.

BACKGROUND

In a military context, defending an area from an enemy offensive requires careful pre-processing in order to best assign the resources that are available to handle the threats, whilst maximising the survival expectancy of the strategic points that are defended.

Depending on the threats, a command and control system determines an engagement solution by taking into account operational and technical criteria.

Determining an engagement solution is not only based on assigning the available weapons to the targets, but is also based on selecting the firing time. The firing time can prove to be very complicated when faced with the numerous constraints and uncertainties that exist in such a complex system.

Therefore, modelling such a scenario poses a real problem that is encountered in the weapons industry when developing solutions to respond to this problem. Indeed, a solution must be able to be found that is based on a time horizon, but that is also able to model the areas of uncertainty when the threat is within range. An operator has to confirm an engagement based on the relevance of the proposed firing times, whilst taking into account the relevance of the associated probabilities of success. The engagement solution has to be feasible and optimal in terms of the probability of success.

A first conventional approach involves modelling the situation as a succession of weapon-to-target assignment problems in a static version. A danger level is assigned to each threat and each weapon is assigned a probability of success against this threat. The problem is rendered dynamic by considering a scenario on a step-by-step basis and by observing the outcomes of each of the combats resulting from the assignment undertaken during the preceding step.

A further conventional approach involves using a discrete time space and associating a probability of success therewith. This approach allows an engagement solution to be planned with a time horizon that is divided into sections. However, none of these solutions is satisfactory for the contemplated applications.

Indeed:
modelling the dynamic problem as a succession of static problems is not always enough for overcoming the real problem insofar as it does not take into account the continuity of the time and the long-term forecasting possibilities of an engagement solution. As the problem is reduced to a succession of static problems, the forecasting notion is absorbed. Long-term planning is not possible. This method does not allow firing to be sequenced for the overall optimisation of the problem; and
discrete time probability modelling does not allow the boundaries of the time segmentation to be reliably managed. Indeed, such modelling assumes that, between two very close time instants, the probability of success can change from 0 to a high value. This represents a significant modelling fault: for example, for the aforementioned application in the military field over ranges of several kilometres, a few metres is negligible and should not lead to such a significant difference.

Consequently, a device or technical means do not exist that allow a resource allocation plan to be determined and optimised.

SUMMARY

The present disclosure relates to a device for optimising a resource allocation plan that allows the aforementioned disadvantages to be overcome.

To this end, according to the disclosure, said device comprising:
means for inputting data;
first means for determining, on the basis of the input data, time windows of availability and effectiveness relating to said resources;
second means for determining, using these time windows, an optimal resource allocation plan; and
user means using an optimal allocation plan determined by the second means, is noteworthy in that said second means comprise:
a first element configured to probabilise a solution space, namely said time windows, by generating continuous functions as a function of time that comply with the time windows; and
a second element configured to optimise the allocation plan on the basis of the solution space thus probabilised.

Thus, a device is obtained that allows a resource allocation plan to be determined and optimised.

The device according to the present disclosure thus comprises, as specified hereinafter, technical means for generating data, technical means for automatically processing data (in order to determine an optimal allocation plan) and technical means for using the results of the processing.

"To probabilise" is understood to be the assigning of probabilities to the elements of the considered set. Conventionally, the probability is an assessment of the probable nature of an event; the higher this number, the greater the chance of the event occurring.

Furthermore, advantageously:
the means for inputting data comprises means (for example a radar unit) for automatically supplying data and/or means for allowing an operator to input data; and/or
the user means comprise display means that displays the optimal allocation plan on a screen; and/or
the display means and the means for allowing an operator to input data are part of a human-machine interface; and/or
the first element is configured to implement an interpolation on the basis of performance points so as to obtain a continuous probability model of the solution space; and/or
the second element is configured to carry out a particle swarm optimisation.

The device according to the disclosure can use any conventional mathematic modelling of the probabilistic type for time windows of availability and effectiveness.

The device according to the disclosure thus allows a simple response to be provided to the modelling problem, whilst including improved reliability in the mathematical representation. The planning with a time horizon and the transition areas are precisely shown. The use of probability laws allows, within an operational system, the availability and effectiveness of each resource to be quantified and thus allows the overall optimisation of the mission over time, whilst maximising the probability of the success of the mission.

To this end, a window of availability of the resources (for example, weapons) is thus defined, which window is associated with a probability of success that is modelled by the fundamental laws of probability.

The device according to the disclosure thus allows the following two problems in particular to be overcome:
the uncertainty at the limits, whilst using the mathematical properties of modelling by the normal law; and
the proposition of a solution with a time horizon.

Furthermore, in addition to more faithfully showing the transition areas, embodiments of the present disclosure allow a solution space to be obtained that is more precise and continuous than a conventional solution based on a discrete space.

The automatic optimisation device according to the disclosure can be applied in numerous fields, as shown hereinafter, and particularly in the military field.

The present disclosure further relates to a system for assigning resources, comprising such an optimisation device. It further relates to a system for handling threats in the military field, in particular of the command and control (C2) type, comprising weapons assignment for handling the threats, said system comprising:
a first unit for retrieving information relating to the considered situation;
a second unit, comprising the aforementioned optimisation device, for processing this information to deduce an engagement proposition therefrom, by firstly determining firing windows on the basis of said information and then deducing the engagement proposition on the basis of said firing windows; and
a third unit for implementing a step of approving the engagement proposition, the engagement being carried out in accordance with an engagement proposition approved by said third unit.

Furthermore, advantageously:
the first unit comprises at least one radar unit that transmits information to said device relating to the air picture of the environment of an area to be protected by the system; and/or
the system further comprises a human-machine interface allowing an operator to complete an approval; and/or
the system further comprises display means that display the engagement proposition approved by said third unit.

The present disclosure further relates to a method for automatically optimising a resource allocation plan.

According to the disclosure, said optimisation method, wherein the following steps are automatically implemented:

A) generating data and determining, on the basis of the generated data, time windows of availability and effectiveness relating to said resources; and B) determining, using said time windows, an optimal resource allocation plan that is subsequently used, is noteworthy in that, during step B), the following successive operations are implemented:
a) probabilising the solution space, namely said time windows, by generating continuous functions as a function of time that comply with said time windows; and
b) optimising the allocation plan on the basis of the solution space thus probabilised.

The method according to the disclosure therefore provides a temporal probability model so as to assess the plan in its entirety, by considering the actual constraints, but also the fuzzy spaces, i.e. the time zone where the threat comes within range.

Advantageously, during the step B/a), an interpolation is implemented on the basis of performance points so as to obtain a continuous probability model of the solution space.

Furthermore, advantageously, during the step B/b), a particle swarm optimisation is carried out. Other conventional optimisation methods (genetic algorithms, greedy algorithms, etc.) are also possible.

Therefore, the present disclosure further relates to a method for handling threats in the military field, comprising weapons assignment for handling the threats.

This method, wherein the following successive steps are implemented:
α) retrieving information relating to the considered situation;
β) processing this information to deduce an engagement proposition therefrom, by firstly determining firing windows on the basis of said information and then deducing the engagement proposition on the basis of said firing windows, said engagement proposition specifying the weapons assignment and the firing instants for handling the threats; and
γ) providing a step of approving the engagement proposition, the engagement being carried out according to an engagement proposition approved during this step γ), is noteworthy, according to the disclosure, in that, during the step β), the engagement proposition is determined by implementing the aforementioned optimisation method.

BRIEF DESCRIPTION OF THE DRAWINGS

The figures in the accompanying drawings will be useful for appreciating how the invention can be produced. In these figures, identical reference numerals designate similar elements.

DETAILED DESCRIPTION

Within the scope of the present disclosure, resource assignment is understood to mean linking resources to objectives, for example weapons to targets to be attained in the military field.

More specifically, embodiments of the present disclosure can be applied to any situation for assigning resources or tasks that can be modelled by windows of availability and effectiveness, i.e., by windows that depend on the amount of time for which the corresponding resource can be used (i.e., is available) and of which the value represents the effectiveness of this resource in attaining its objective, for example the effectiveness of a weapon, such as a missile, in destroying a target.

Numerous applications are possible in the field of mission planning and/or mission control, and this is particularly the case in the following sectors: civil or military aviation (mission preparation for weapons systems), autonomous civil or military systems (drones), air transport (airport management), the field of general logistics, the transport field (rail transport, traffic management, freight, etc.).

Even though it can be thus used in numerous fields, the present disclosure is more particularly applicable to the military field and is, more specifically, applicable to the case of command and control (C2) systems that manage weapon target assignment in particular.

Figure 1:
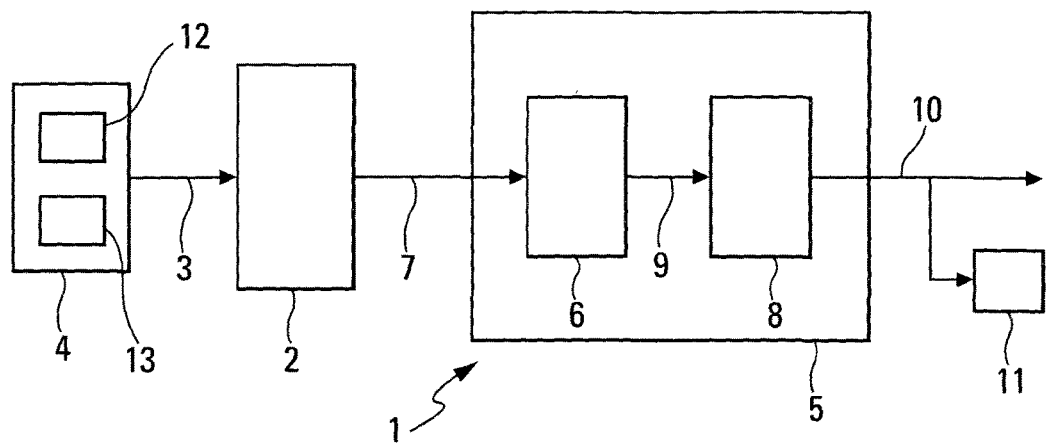
FIG. 1 is a block diagram of a device according to the disclosure.

The device 1, according to the invention and schematically shown in FIG. 1, is intended to carry out the automatic optimisation of a resource allocation plan, i.e. to determine a plan that best optimises the assignment of various considered resources for specific ends, for example weapons for handling threats.

To this end, said optimisation device 1 is of the type comprising:
means 4 for inputting data;
means 2 for determining, on the basis of received information and data, time windows of availability and effectiveness, particularly weapons firing windows, relating to the considered resources. Said information and data are received from the means 4 for inputting data through a link 3;
means 5 that are connected through a link 7 to said means 2 and that are designed so as to determine, using said time windows, an optimal resource allocation plan; and
user means 11 that use the optimal allocation plan determined by the means 5.

Within the scope of the present disclosure, the means 4 for inputting data can comprise:
means 12 (devices or systems such as a radar unit, for example) for automatically supplying data; and/or
means 13 for allowing an operator to input data, in particular manually. Said means 13 can comprise a keyboard, a mouse, a touchpad, etc., or any other conventional means associated with a screen, for example, that allow an operator to input data into said device 1.

According to the disclosure, said means 5 comprise, as shown in FIG. 1:
an element 6 that is connected through the link 7 to said means 2 and is designed so as to probabilise a solution space, namely said time windows, by generating continuous functions as a function of time that comply with said time windows; and
an element 8 that is connected through a link 9 to the element 6 and is formed so as to optimise the allocation plan on the basis of the solution space thus probabilised.

The element 8 then transmits the optimal allocation plan through a link 10 to the user means 11. The user means 11 uses the optimal allocation plan determined by the means 5. The user means 11 comprises, for example, a display unit (that displays this optimal allocation plan on a screen) or printing means (that print the optimal allocation plan). The means 11 can form a human-machine interface with the means 13.

In a particular embodiment, the element 6 implements an interpolation on the basis of performance points so as to obtain a continuous probability model of the solution space (time windows of availability and of effectiveness). An interpolation of this type can be implemented accurately and effectively by using a conventional Bezier spline interpolation, for example.

The modelling implemented by the device 1 is based on conventional probability laws (Gaussian, Poisson, etc.). This solution allows:
the probability of success to be defined as a function of time; and
the allocation plan to be anticipated in the long term.

It is to be noted that an advantage of the probabilised spaces is that a major mathematical theory exists relating to the combination of events (independent or non-independent) that makes this approach even more reliable.

Figure 2:
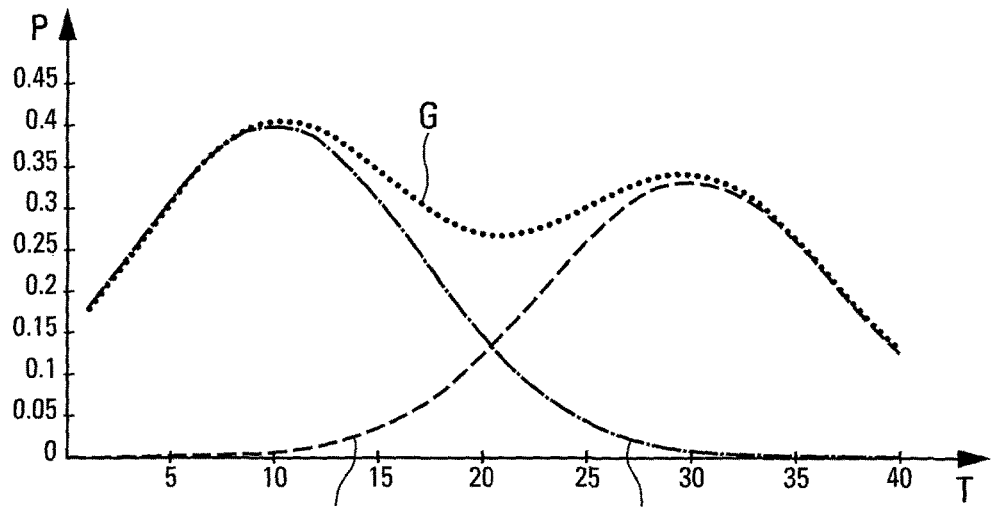
FIG. 2 is a graph explaining features of the method implemented by the device according to the disclosure.

By way of an illustration, FIG. 2 (which shows a probability P as a function of time T) shows a probability curve G that is an availability and effectiveness curve and is modelled as a sum of two Gaussians F1 and F2.

Furthermore, in a particular embodiment, the element 8 uses an optimisation method that is based on the principle of particle swarm optimisation, as defined, for example, in an article by Leboucher, Chelouah, Siarry and Le Ménec, "A Swarm Intelligence Method Combined to Evolutionary Game Theory Applied to the Resources Allocation Problem" and published in the "International Journal of Swarm Intelligence Research (IJSIR)", vol. 3, pp. 20-38, 2012.

Said device 1 according to the present disclosure can be applied in numerous fields.

In a preferred application, said device 1 forms part of a system 15 for handling threats in the military field, in particular of the command and control type, comprising weapons assignment, in particular missiles, for handling threats (generally airborne threats).

Figure 3:
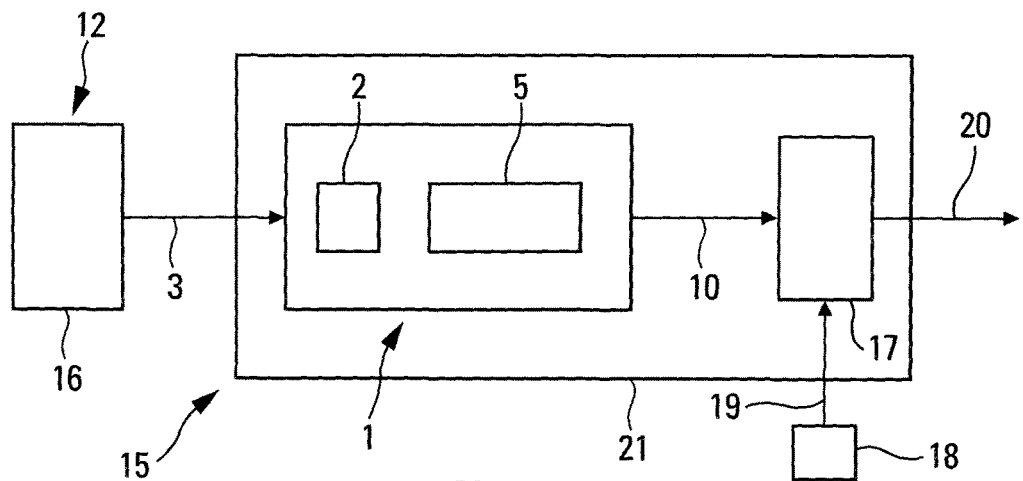
FIG. 3 is a block diagram of a system for handling threats using a device according to the disclosure.

This system 15 comprises, as shown in FIG. 3:
means 12 that comprises at least one radar unit 16 that transmits information to the device 1 via the link 3 relating to the air picture of the environment of the area to be protected by the system 15. The means 12 can already form part (at least in part) of the device 1 or can be dedicated to the system 15. The radar unit 16 detects threats and transmits the corresponding information, in particular the position and the kinematics of the threats;
said device 1 processes this information to deduce an engagement proposition therefrom, by firstly determining firing windows using the means 2 on the basis of said previously formatted information and then deducing, using the means 5, the engagement proposition on the basis of these firing windows. This engagement proposition is an optimal allocation plan that specifies a weapons assignment and schedules firing instants or times for handling the threats; and
means 17 for implementing a step of approving the engagement proposition received from the device 1 via the link 10. The approval is given by an operator using means 18 (forming part of the aforementioned human-machine interface, for example) that is connected through a link 19 to said means 17.

Then, the engagement is carried out in accordance with the engagement proposition approved by said means 17 and transmitted via a link 20, for example to display means (not shown). The means 17 and the device 1 (in particular its means 2, 6 and 8) are part of an information processing unit 21, for example.

The processing implemented by the various means of the device 1 will be described in detail hereinafter.

On the basis of the information provided by the radar unit 16, the information is post-processed by the device 1 so that it can be used. This processing is divided into two sub-tasks: computing the attainment capability of missiles to the considered threat and optimising the firing sequence in order to optimise the handling of all of the threats.

Computing the attainment capability, which is conventionally implemented by the means 2, involves converting the information provided by the radar unit 16 and formatted into firing windows in order to compute the best firing sequence in terms of the engagement plan. To this end, the means 2 computes, for example, the intersection between a path and a volume, the inputs of which are the kinematics of the threat and the performance capabilities of the weapons.

The means 2 supplies temporal firing windows that possibly can be divided into a plurality of parts.

The means 5 then determines the engagement plan as a function of these firing windows.

The means 5 therefore uses the firing windows as input and, once the optimal solution has been determined, they provide a set of solutions of the following type: {Missile; Threat; Firing Time}.

To this end, the element 6 of the means 5 firstly probabilises the solution space, namely said firing windows, by generating continuous functions modelling said firing windows.

As indicated above, the solution space can be probabilised by using a simple interpolation system on the basis of performance points. Interpolation of this type can be precisely and effectively implemented using a Bezier spline interpolation, for example. Therefore, a continuous probability model of the solution space is obtained on the basis of real performance points, i.e. the probability of the success of firing as a function of the firing instant (or time).

The solution has to take into account three significant points: the association of missiles for handling a single threat, the possibility of planning the intervention with a time horizon and the definition of a criterion that is a common metric, for example based on the ability of the system to deal with any type of scenario. The device 1 according to the disclosure allows these various aspects to be taken into account.

A probabilised approach based on a succession of temporal events that can be considered to be independent or non-independent is modelled in a known manner. Therefore, combining missiles so as to intercept a single threat can be quantified very precisely. The approach taken into account by the device 1, based on forecasting with a time horizon, allows all of the possible combinations to be examined in terms of missiles used and of time. Therefore, the aim is no longer to optimise only one pair {Missile 1-Missile 2} but to optimise a triplet {Missile 1-Missile 2-Interception time}.

As indicated above, planning with a time horizon is essential in order to successfully complete a mission. Selecting a continuous function relative to the modelling time considerably improves the accuracy of the model used.

With regard to the optimisation implemented by the element 8, as is the case for any optimisation problem, defining a measurement that allows the solutions to be compared with each other is essential. The proposed approach is therefore based on the probabilities. The quality of a solution therefore needs to be defined by a probability.

Indeed, the proposed model is based on a succession of independent or non-independent events, for which the rules of association are mathematically known. The general criterion for assessing a solution can thus be based on the total probability that all of the threats are handled or alternatively on the survival of the defended zone. The two approaches can also be combined.

The present disclosure allows the following two problems to be overcome:
  modelling uncertainties associated with the context and the probability of better and long-term forecasting of an engagement by taking into account a situation that continuously evolves over time; and
  resolving problems on the boundaries of the fields of the attainment capability for more realistic modelling.

The device 1 has been described above in an application with a system 15 of the C2 type. However, numerous other applications are possible in the field of mission planning and/or of mission control, and in particular in the following sectors: civil or military aviation (mission preparation for weapons systems), autonomous civil or military systems (drones), air transport (airport management), the field of general logistics, the transport field (rail transport, traffic management, freight, etc.).

While illustrative embodiments have been illustrated and described, it will be appreciated that other embodiments are also possible within the scope of the present disclosure.

The invention claimed is:

1. A system for missile weapons assignment for handling airborne threats in the military field, said system comprising:
   a first unit for retrieving information relating to a considered situation;
   a second unit for processing said information to deduce an engagement proposition therefrom, by firstly determining firing windows on the basis of said information and then deducing the engagement proposition on the basis of said firing windows, said engagement proposition specifying the missile weapons assignment and firing instants for handling the airborne threats; and
   a third unit for implementing a step of approving the engagement proposition, an engagement being carried out in accordance with the engagement proposition approved by said third unit,
   wherein said second unit comprises an automatic device for optimising a weapon resource allocation plan, said device comprising:
   means for inputting data;
   first means for determining, on the basis of the input data, weapon firing windows of availability and effectiveness relating to missile weapon resources;
   second means for determining, using said weapon firing windows, an optimal resource allocation plan for said missile weapon resources; and
   user means using an optimal allocation plan determined by said second means,
   wherein said second means comprises:
      a first element configured to probabilise a solution space, namely, said weapon firing windows, by generating continuous functions as a function of time that comply with said weapon firing windows, wherein said first element is configured to implement an interpolation on the basis of performance points so as to obtain a continuous probability model of said solution space, and wherein said interpolation is a Bezier spline interpolation; and
      a second element configured to optimise the allocation plan on the basis of said solution space thus probabilised.

2. The system according to claim 1, wherein said means for inputting data comprises means for allowing data to be automatically supplied.

3. The system according to claim 1, wherein said means for inputting data comprises means for allowing an operator to input data.

4. The system according to claim 1, wherein the user means comprises display means configured to display the optimal allocation plan on a screen.

5. The system according to claim 1, wherein said means for inputting data and said user means are part of a human-machine interface.

6. The system according to claim 1, wherein said second element is configured to carry out a particle swarm optimisation.

7. The system according to claim 1 wherein said first unit comprises at least one radar unit that transmits information to said device relating to an air picture of the environment of an area to be protected by said system.

8. The system according to claim 1 further comprising a human-machine interface allowing an operator to complete an approval.

9. The system according to claim 1, further comprising display means configured to display the engagement proposition approved by said third unit.

10. A method for handling airborne threats in the military field, comprising missile weapons assignment for handling the airborne threats, which method implements the following successive steps:
- α) retrieving information relating to a considered situation;
- β) processing said information to deduce an engagement proposition therefrom, by firstly determining firing windows on the basis of said information and then deducing the engagement proposition on the basis of said firing windows, said engagement proposition specifying the weapons assignment and firing instants for handling the airborne threats; and
- γ) approving the engagement proposition, an engagement being carried out according to the engagement proposition, wherein, during step β), the engagement proposition is determined by optimising a weapon resource allocation plan, wherein the following steps are automatically implemented:
A) generating data and determining, on the basis of the generated data, weapon firing windows of availability and effectiveness relating to missile weapon resources; and
B) determining, using said weapon firing windows, an optimal resource allocation plan for said missile weapon resources that is subsequently used, wherein, during step B), the following successive operations are implemented:
- a) determining the probability of a solution space by generating continuous functions as a function of time that comply with said weapon firing windows by implementing an interpolation on the basis of performance points so as to obtain a continuous probability model of said solution space, and wherein said interpolation is a Bezier spline interpolation; and
- b) optimising the allocation plan on the basis of the solution space thus probabilised.

* * * * *